(12) United States Patent
Osmond

(10) Patent No.: US 8,909,781 B2
(45) Date of Patent: Dec. 9, 2014

(54) VIRTUAL ACCESS TO NETWORK SERVICES

(75) Inventor: Roger Fredrick Osmond, Littleton, MA (US)

(73) Assignee: Pi-Coral, Inc., San Jose, CA (US)

( * ) Notice: Subject to any disclaimer, the term of this patent is extended or adjusted under 35 U.S.C. 154(b) by 209 days.

(21) Appl. No.: 13/559,360

(22) Filed: Jul. 26, 2012

(65) Prior Publication Data

US 2013/0031549 A1 Jan. 31, 2013

Related U.S. Application Data

(60) Provisional application No. 61/511,684, filed on Jul. 26, 2011.

(51) Int. Cl.
| | |
|---|---|
| G06F 15/173 | (2006.01) |
| G06F 9/54 | (2006.01) |
| H04L 12/28 | (2006.01) |
| H04L 12/46 | (2006.01) |
| H04L 29/06 | (2006.01) |
| H04L 12/54 | (2013.01) |
| G06F 9/455 | (2006.01) |
| G06F 9/50 | (2006.01) |

(52) U.S. Cl.
CPC ............. *G06F 9/54* (2013.01); *H04L 12/2856* (2013.01); *H04L 12/287* (2013.01); *H04L 12/4641* (2013.01); *H04L 63/10* (2013.01); *H04L 12/5692* (2013.01); *G06F 9/45558* (2013.01); *G06F 9/5055* (2013.01)
USPC ............................ 709/225; 709/223; 709/229

(58) Field of Classification Search
CPC .............. H04L 12/287; H04L 12/4641; H04L 12/2856; H04L 12/5692; H04L 63/10
USPC ......... 709/224, 200, 223, 217, 316, 225, 229; 717/109, 120; 707/760, 713, 749; 718/105
See application file for complete search history.

(56) References Cited

U.S. PATENT DOCUMENTS

| | | | |
|---|---|---|---|
| 5,361,349 A | 11/1994 | Sugita et al. | |
| 6,052,697 A | 4/2000 | Bennett et al. | |
| 6,579,036 B2 | 6/2003 | Attar | |
| 6,625,592 B1 | 9/2003 | Dyer et al. | |
| 6,938,059 B2 | 8/2005 | Tamer et al. | |
| 7,043,494 B1 | 5/2006 | Joshi et al. | |
| 7,757,210 B1 * | 7/2010 | Krueger | 717/120 |

(Continued)

FOREIGN PATENT DOCUMENTS

WO WO 2007/011164 1/2007

OTHER PUBLICATIONS

Aprian Mehis, et al., Designing and Optimizing Dell/EMC SAN Configurations Part 1, Power Solutions, Jun. 2004, pp. 94-98.

(Continued)

*Primary Examiner* — Le H Luu
(74) *Attorney, Agent, or Firm* — Pepper Hamilton LLP

(57) ABSTRACT

Methods, systems, and computer readable storage media for providing virtual access to network services. A virtual storage layer contains reference objects configured to reference network services stored in a network computing environment. Network clients access the reference objects through a resource interface based on a resource identifier associated with the virtual storage layer. Initiation of the virtual service by a network client invokes the service in a native computing environment of the service.

20 Claims, 5 Drawing Sheets

(56) References Cited

U.S. PATENT DOCUMENTS

| | | | |
|---|---|---|---|
| 8,176,319 B2 | 5/2012 | Osmond et al. | |
| 8,185,751 B2 | 5/2012 | Osmond et al. | |
| 2001/0049671 A1 | 12/2001 | Joerg | |
| 2002/0019908 A1 | 2/2002 | Reuter et al. | |
| 2002/0091872 A1* | 7/2002 | Bourke-Dunphy et al. | 709/316 |
| 2003/0093496 A1* | 5/2003 | O'Connor et al. | 709/217 |
| 2003/0149751 A1* | 8/2003 | Bellinger et al. | 709/220 |
| 2003/0200295 A1* | 10/2003 | Roberts et al. | 709/223 |
| 2004/0030822 A1 | 2/2004 | Rajan et al. | |
| 2004/0078353 A1 | 4/2004 | Brock et al. | |
| 2004/0148588 A1* | 7/2004 | Sadiq | 717/109 |
| 2004/0205101 A1* | 10/2004 | Radhakrishnan | 709/200 |
| 2004/0215729 A1 | 10/2004 | Kuwata et al. | |
| 2005/0195660 A1 | 9/2005 | Kavuri et al. | |
| 2005/0198330 A1 | 9/2005 | Kawabata et al. | |
| 2005/0278348 A1* | 12/2005 | Falter et al. | 707/760 |
| 2006/0047930 A1 | 3/2006 | Takahashi et al. | |
| 2006/0059173 A1 | 3/2006 | Hirsch et al. | |
| 2006/0248200 A1 | 11/2006 | Stanev | |
| 2006/0294126 A1 | 12/2006 | Ganjoo | |
| 2007/0143859 A1 | 6/2007 | Ogi et al. | |
| 2007/0276765 A1 | 11/2007 | Hazel et al. | |
| 2007/0294215 A1* | 12/2007 | Boss et al. | 707/713 |
| 2008/0065639 A1 | 3/2008 | Choudhary et al. | |
| 2008/0127354 A1 | 5/2008 | Carpenter et al. | |
| 2008/0147787 A1* | 6/2008 | Wilkinson et al. | 709/203 |
| 2008/0147960 A1 | 6/2008 | Sugino et al. | |
| 2009/0119298 A1 | 5/2009 | Faitelson et al. | |
| 2009/0228514 A1 | 9/2009 | Liu et al. | |
| 2009/0240823 A1 | 9/2009 | Rider et al. | |
| 2009/0271412 A1 | 10/2009 | Lacapra et al. | |
| 2010/0299333 A1 | 11/2010 | Osmond | |
| 2010/0299362 A1 | 11/2010 | Osmond | |
| 2010/0306269 A1 | 12/2010 | Osmond | |
| 2011/0055536 A1 | 3/2011 | Banga et al. | |
| 2012/0036252 A1* | 2/2012 | Shi et al. | 709/224 |
| 2012/0060171 A1* | 3/2012 | Bobroff et al. | 718/105 |
| 2012/0102050 A1* | 4/2012 | Button et al. | 707/749 |

OTHER PUBLICATIONS

Baiocchi, Giovanni, Using Perl for Statistics, Data Processing and Statistical Computing, Journal of Statistical Software, May 2004, vol. 11, Issue 1.

Benford, The Law of Anomalous Numbers, Proc. Amer. Phil. Soc. 78:551-572, 1938.

Broder, et al., Using Multiple Hash Functions to Improve IP Lookups, IEEE Infocom 2001, pp. 1-10.

Chen, Multiple-Watermarking Scheme of the European Article Number Barcode Using Similar Code Division Multiple Access Technique, 2008 Applied Mathematics and Computation 197:243-261, 2008.

* cited by examiner

VIRTUAL ACCESS TO NETWORK SERVICES

CROSS-REFERENCE TO RELATED APPLICATION(S)

This application claims priority under 35 U.S.C. §119(e) to U.S. Provisional Application No. 61/511,684, filed on Jul. 26, 2011, the contents of which are incorporated by reference in their entirety as if fully set forth herein. This application is related to co-pending U.S. patent application Ser. No. 12/785,993, filed on May 24, 2010, the contents of which are incorporated by reference in their entirety as if fully set forth herein.

BACKGROUND

Corporate and individual users increasingly rely on network service providers to deliver necessary business and productivity services, including document collaboration, storage and back-up, Software-as-a-Service (SaaS), file and content sharing, customer relationship management (CRM), and enterprise resource planning (ERP). Growth in this area has been powered by technological advances in many areas, especially in network computing systems such as cloud computing systems. Nonetheless, certain operational aspects of these networks limit the efficiency and scalability that will be required for future growth. For example, access by numerous clients may lead to services and related data being duplicated throughout the network. This duplication may be multiplied as services and clients interact with each other, continuously requesting copies of content and invoking additional instances of network services. The replication of services and content causes a strain on network resources and storage capacity, ultimately affecting the ability of network services to efficiently and effectively meet the demands of network clients.

SUMMARY

This disclosure is not limited to the particular systems, devices and methods described, as these may vary. The terminology used in the description is for the purpose of describing the particular versions or embodiments only, and is not intended to limit the scope.

In one embodiment, a system may provide virtual access to a service. The system may comprise a virtual storage layer arranged in a network computing environment. The virtual storage layer may comprise a virtual container associated with a virtual service. The virtual container may store a reference object configured to reference the service associated with the virtual service. Client access to the virtual service may be provided through a resource interface. Initiation of the virtual service by a client through the reference object may invoke the service to operate in a native computing environment of the service.

In another embodiment, a method may provide virtual access to a service. The method may operate to provide, by a processor of a computing device, a virtual storage layer arranged in a network computing environment. The virtual storage layer may comprise a virtual container associated with a virtual service. The virtual container may store a reference object configured to reference the service associated with the virtual service. The method may provide client access to the virtual service through a resource interface. The virtual service may be initiated by a client through the reference object, invoking the service to operate in a native computing environment of the service.

In an additional embodiment, a computer readable storage medium may have computer readable program code configured to provide virtual access to at least one service. The computer readable program code may be configured to provide a virtual storage layer arranged in a network computing environment. The virtual storage layer may comprise a virtual container associated with a virtual service. The virtual container may store a reference object configured to reference the service associated with the virtual service. The computer readable program code may be configured to provide client access to the virtual service through a resource interface. The virtual service may be initiated by a client through the reference object via the computer readable program code, invoking the service to operate in a native computing environment of the service.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
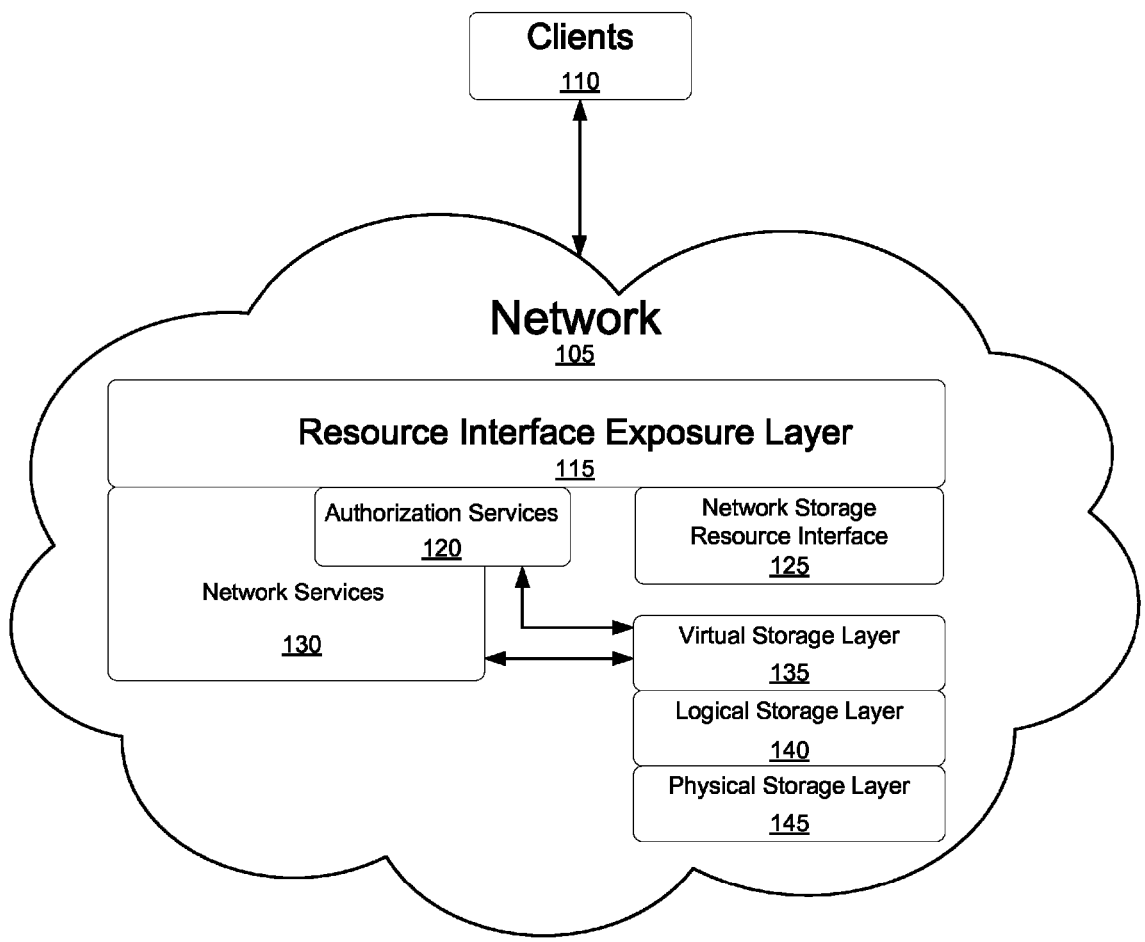
FIG. 1 depicts a block diagram for an illustrative system for providing virtual access to a network service, arranged according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "service" refers to a service provided by a network computing environment that provides a network function or shared resource to a client computing device or application accessing the service. Services may require the installation of computer processing logic (e.g., software programs) and related data on a network-accessible server. The computer processing logic may provide the computation and data manipulation functions of the service. Illustrative services include the Domain Name System (DNS), document collaboration, storage and back-up, Software-as-a-Service (SaaS), file and content sharing, social networking, customer relationship management (CRM), and enterprise resource planning (ERP) services A "reference object" refers to a reference to an object, such as a service, a data object, another reference object, or other elements associated with a computing device or network computing environment. The reference object may operate as a virtual pointer to one or more objects in a manner that provides indirect access to the actual object. For example, a reference object may refer to multiple files (e.g., a sound file and a video file of a multimedia content object) that appear as a single file to a client application (e.g., a multimedia content player), as a single reference object may point to all of the files.

"Virtual access" refers to accessing an object or service indirectly through a reference object. The object or service returned through a virtual access may appear as the actual object or service requested. For example, a client application accessing a file through a reference object may view the file as though the client application accessed the file directly. As such, a client application may virtually access an object without being effected by the server implementation or file structure of the server hosting the object.

A "virtual storage layer" refers to a virtual storage construct configured to store reference objects instead of the actual objects referred to by the reference objects. One or more software applications or processes may operate to implement the virtual storage layer. The virtual storage layer may be in communication with one or more physical and/or logical storage layers storing the actual objects referred to by the reference objects. For instance, a client application may indirectly access the actual objects stored in the logical storage layer of a network by accessing the corresponding reference objects. The virtual storage layer may operate to provide a uniform interface to network clients for the heterogeneous hardware and/or software configurations of the underlying physical or logical storage structures.

A "virtual container" refers to a storage structure configured to store reference objects within a virtual storage layer. Virtual containers may store reference objects referencing data, services, or other virtual containers. Each virtual container may be associated with an owner, such as one or more network users, computing devices, or applications, and may be referred to as a "user space" or "owner space." A virtual container may be identifiable through a resource identifier, such as a universal resource identifier (URI), configured to identify the virtual container and/or any reference objects contained therein. Each virtual container may be associated with one or more permissions specifying access to the virtual container and any reference objects associated with the virtual container. For instance, a virtual container may specify list, read, write, delete, update, and manage permissions for client applications and/or users.

A "virtual service" refers to a service embedded in a virtual container, such as a user space. For example, a service may be embedded in a virtual container through a reference object stored in the virtual container that references the service. In this manner, the service does not have to be copied nor require its own space elsewhere, such as another location in the same or a different network computing environment.

A "resource interface" refers to an interface for accessing a resource. An illustrative resource interface includes an application programming interface (API). For example, a client application may use a resource interface to access a virtual container specified by a URI. The resource interface may provide access to a virtual container and any reference objects stored in the virtual container, depending on any permissions associated with the virtual container.

A "native computing environment" refers to the native operating or storage environment of a service or data. For example, the computing environment where an object is stored that is referred to by a reference object may comprise the native computing environment for that object. This is in contrast to the computing environment of the reference object itself. The native computing environment may encompass a particular computing device or the equivalent hardware and/or software of a particular computing device.

This disclosure is generally drawn, inter alia, to technologies including methods, systems, and computer readable storage media for providing virtual access to network services. In various embodiments, a virtual container may be configured within a virtual storage layer that comprises a reference object to a service resident in a network computing environment. A resource interface may be configured to provide access to the reference object referencing a service associated with the virtual resource. The resource interface may access the virtual container via a resource identifier that identifies the virtual container and/or the reference object. For example, a client application may use an API to interact with the virtual service reference object associated with a virtual container having a specific universal resource identifier (URI). In this manner, the client application may access the service resident in the network computing environment through the virtual storage layer.

FIG. 1 depicts a block diagram for an illustrative system 100 for providing virtual access to a network service, arranged according to an embodiment. As shown in FIG. 1, a network 105 may comprise a physical storage layer 145, a logical storage layer 140, and a virtual service layer 135. In an embodiment, network 105 may comprise a cloud computing network, such as Amazon® Elastic Compute Cloud (Amazon EC2®). In another embodiment, network 105 may comprise an Internet service provider (ISP) network, such as the ISP networks provided by Verizon® and Comcast®. In a further embodiment, network 105 may comprise a network service provider (NSP) network, such as the NSP networks provided by MCI® and Sprint®. Embodiments are not limited to cloud computing networks, ISP networks, or NSP networks, as any network computing environment capable of operating according to embodiments is contemplated herein.

Physical storage layer 145 may include physical data stores and related services configured to store data and applications within network 105. Logical storage layer 140 may comprise abstract protocols for accessing data stored within physical storage layer 145, such as file systems, folders, and directories. Virtual storage layer 135 may comprise software components configured to store references to objects stored in logical storage layer 140 and/or physical storage layer 145. In an embodiment, virtual storage layer 135 may operate to provide a uniform interface for the underlying physical or logical storage structures.

Network 105 may be associated with network services 130 configured to provide network functions or shared resources. As illustrated in FIG. 1, virtual storage layer 135 may be associated with network services 130, for example, through one or more reference objects stored in virtual storage layer 135 configured to reference network services 130. Network services 130 may comprise any services capable of functioning or being accessed from within network 105, including, without limitation, content collaboration, content sharing, content publishing, data storage, data backup, electronic commerce ("e-commerce"), network and computing device security, software-as-a-service (SaaS), customer relationship management (CRM), enterprise resource planning (ERP), business processes, business analytics, and social graph (e.g., social networking) services. In an embodiment, network 105 may be associated with certain authorization services 120 configured to provide security services for network 105. For example, an authorization service 120 may include network authentication and resource permissions services. A virtual storage layer 135 may additionally provide references to authorization services 120.

Clients 110 may access network 105 via one or more communication protocols, including, but not limited to, transmission control protocol (TCP), Internet protocol (IP), hypertext transfer protocol (HTTP), HTTP secure (HTTPS), and combinations thereof. Network 105 may expose a resource interface exposure layer 115 to clients 110 to provide client computing device or client application access to network services 130 and/or authorization services 120. An illustrative resource interface comprises an application programming interface (API). In an embodiment, a client may access a virtual service associated with virtual storage layer 135 through an API configured to provide an interface for client applications to virtually access network services 130. Network 105 may additionally provide access to one or more of network storage components 135, 140, 145 through a network storage resource interface 125.

In an embodiment, API calls may be tracked by a service or network provider, such as an ISP, NSP, or cloud storage provider. For instance, the tracked API calls may be used to track service usage for certain processes, including revenue capture or performance and activity monitoring. The improved tracking ability may increase, inter alia, revenue capture for service or network providers and encourage network or service clients to store more digital assets with the service or network provider instead of scattering them among multiple other networks, including the Internet.

Although network services 130 in FIG. 1 are depicted as being in the same network 105 as virtual storage layer 135, embodiments are not so limited, as virtual storage layer 135 may reference network services in any accessible network, such as an NSP network, other proprietary network, and the Internet. For example, network services 130 may operate on data that is stored on another network or a cloud service, such as various forms of cloud storage services. Development of such network services 130 requires unencumbered access to one or more servers and corresponding resources. Such access is necessary to provision a server to support network services 130, for instance, to install and configure associated programs and/or to create and configure a database. Programs on the server may implement, in whole or in part, the logic required for network services 130. Accordingly, through virtual storage layer 135, embodiments may provide virtual access to network services 130 that may use cloud or other network data storage and that do not require additional computational components (e.g., software programs and/or logic) on the server providing access to client 110 (e.g., an Internet or web server).

Figure 2:
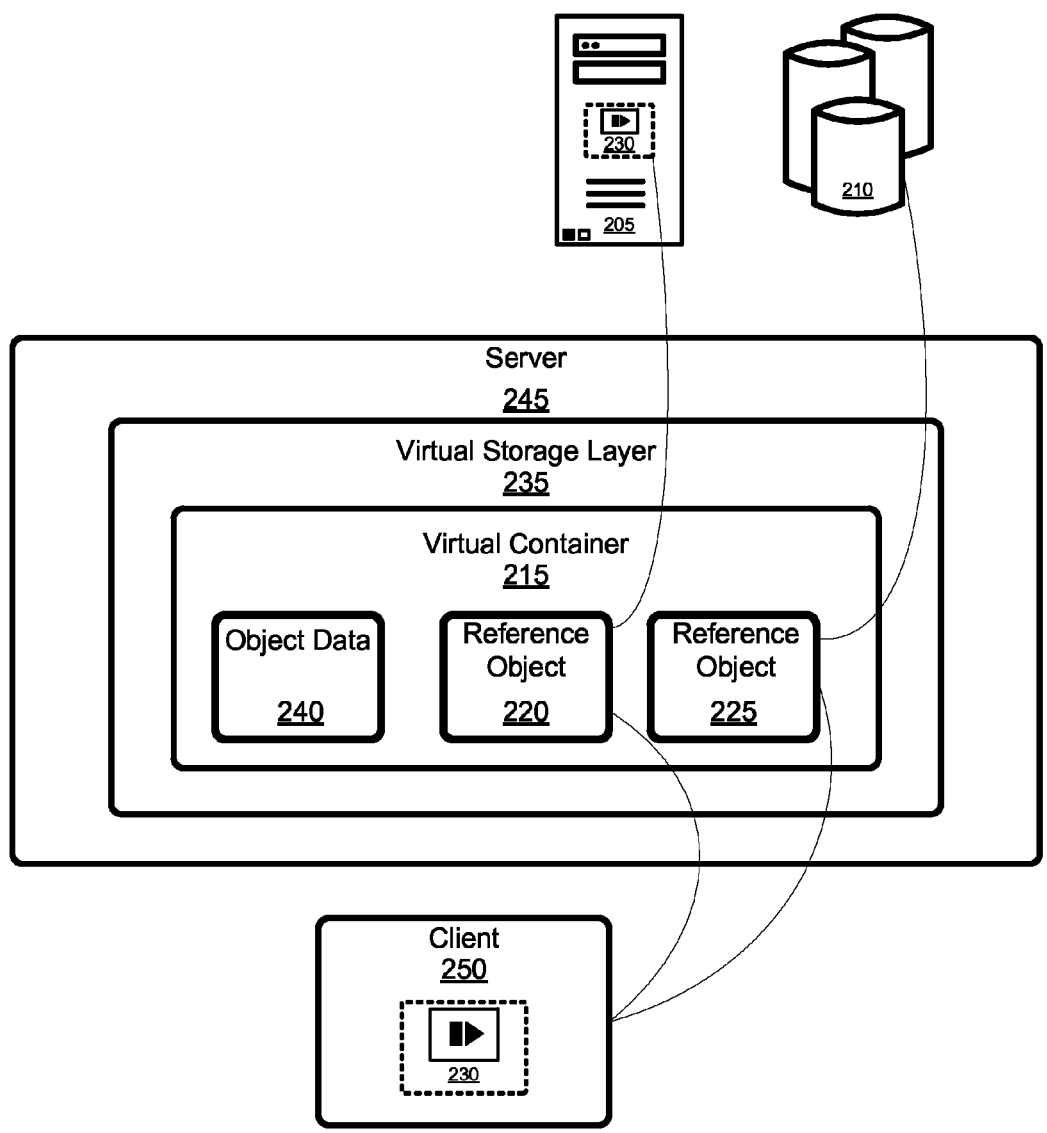
FIG. 2 depicts an illustrative block diagram of a virtual storage layer according to an embodiment.

Referring to FIG. 2, therein is provided an example block diagram of a virtual storage layer according to an embodiment. A virtual storage layer 235 may be arranged on one or more server computing devices 245, for example, through one or more software applications configured to implement virtual storage layer 235. A virtual container 215 may be created within virtual storage layer 235. According to an embodiment, virtual container 215 may be a storage structure configured to store objects within virtual storage layer 235. Illustrative objects stored in virtual container 215 may include reference objects 220, 225 and data objects 240. Reference object 225 may comprise a reference to data 210 stored on another network, such as e-commerce, content sharing, or financial data. Reference object 220 may comprise a reference to a service 230 installed on one or more computing devices 205. Illustrative services include content sharing services, such as Twitter® or Pinterest®, or social networking services, such as Facebook® or LinkedIn®. In an embodiment, virtual container 215 may be associated with service 230 referenced by reference object 220. Virtual container 215 may store data objects 240, such as data required for using service 230 referenced by reference object 220.

A client 250 may access virtual container 215 through a resource interface. In an embodiment, virtual container 215 may be identified using a resource identifier, such as a universal resource identifier (URI). For example, a client may access virtual container 215 and any object contained therein (e.g., reference objects 220, 225 and data objects 240) through an API based on a URI specific for the virtual container. An illustrative URI is a universal resource locator (URL). In an embodiment, the resource interface may detect the resource identifier, for example, by using pattern matching. As shown in FIG. 2, client 250 may access service 230 resident on server 205 through reference object 220. In addition, client 250 may access data 210, such as data required for operation of service 230. As such, client 250 may access service 230 and data 210 through server 245 without service 230 and/or any supportive software or data being installed on server 245.

Figure 3:
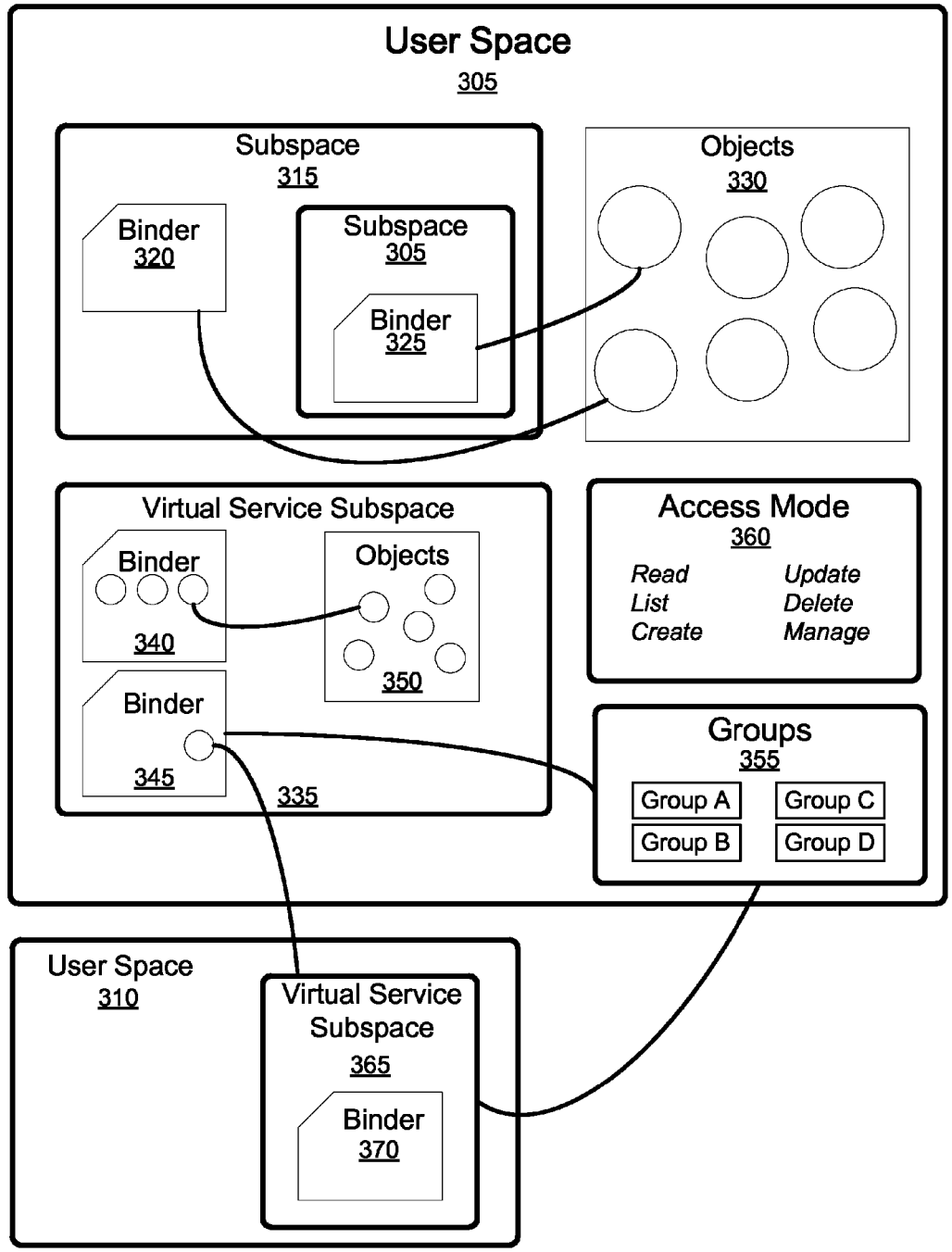
FIG. 3 depicts an illustrative block diagram of a virtual container according to an embodiment.

FIG. 3 illustrates an example block diagram of a virtual container according to an embodiment. A virtual container 305 may be associated with an owner (e.g., one or more client users, computing devices, or applications) and may be referred to as a user space or owner space 305. As shown in FIG. 3, user space 305 may comprise multiple subspaces 315, 335, which may themselves comprise other subspaces 305. Each subspace may store one or more binders 320, 325, 340, 345 that, according to certain embodiments, may comprise data structures configured to store data, references to data, and/or references to other objects. User space 305 and subspaces 315, 335 may each be associated with objects 330, 350, such as data objects or references to data objects.

User space 305 or subspace 315, 335 may be associated with a virtual service and referred to as a virtual service subpace 335. In an embodiment, ownership of the virtual service subspace 335 may be the same as ownership of the enclosing space 305. For example, when a user attempts to access virtual subspace 335 and any subordinate component 340, 345, 350 resources, the access policy associated with enclosing user space 305 may be applied, enforcing any access group memberships, rules, or access actions.

In an embodiment, user space 305 may be associated with one or more access modes 360, such as read, list, create, update, delete, and manage access modes. In addition, each access mode may be associated with one or more access groups, access rules, and/or access actions. For instance, to support the virtual service with tighter control, an access rule may be associated with virtual service subspace 335 such that accesses may be managed according to access modes 360, and may be restricted to agents (e.g., client programs) with specific identities or that provide predetermined pass codes or access keys. In an embodiment, the specific identities may be arranged as one or more access groups 355 configured to have access to user space 305 based on configured access modes 360.

As illustrated in FIG. 3, an owner of virtual service subspace 335 may create references to an equivalent virtual service subspace 365, and resources 370 contained therein, residing in another user space 310 associated with a different owner.

In an embodiment, an owner may create access groups 355 and add binders to a virtual container, such as virtual service subspace 335 and binder 345, that reference access groups 355. For example, binders 345, 370 may be created within each instance of virtual service subspaces 335, 365 such that each of these virtual service subspaces 335, 365 may contain references to access groups 355. As such, access group 355 referred to by the references may be accessed, per the access policy, by other virtual container owners, and thereby the virtual containers (e.g., virtual service subspaces 335, 365) may be shared.

In an embodiment, an owner of user space 305 may access resources within virtual subspaces 315, 335 contained therein. The owner may be considered to have access rights based on possession of the resources. An owner of a user space may impose restrictions on their user space and any elements contained in their user space on a per-service or per-space basis. For example, an owner may provide additional access rules prohibiting creation, in binders belonging to a virtual service subspace, any reference to assets not specifically in that instance of the virtual service subspace.

A service, such as a content transformation service (e.g., a photo sharing and editing service), managed according to conventional methods may store a copy of content used through the content sharing service. For example, a first user may have content stored on their computing device (e.g., a laptop or tablet computing device) that they want to share through the content transformation service. When the user accesses the content transformation service, a copy of the content (e.g., a file, such as an image file) may be created and stored by the content transformation service on one or more associated networks. A second user may seek to access the content shared by the first user through the content transformation service. In a conventional system, the second user would access the copies of the shared content and may likely make their own copies, for instance, that are stored on their computing device or in a separate network location.

According to certain embodiments described herein, the copying of digital assets, such as the shared content files, may be avoided as users may access digital assets stored in a user space through reference objects without generating copies. For instance, multiple users and services may access digital assets stored and managed from one location, such as a user space. In an embodiment, each instance of a service may interact with the content stored in a user space instead of operating with copies generated and stored in a storage location, such as a folder in a logical storage location. In this manner, network efficiency and user privacy and control of digital assets may be increased.

In an illustrative and non-restrictive example, an application developer may develop a service, such as a photo sharing application, located in an NSP, ISP, or other network computing environment. Each user space owner participating in the service may have a subspace created within their own personal space responsive to a request to enroll in the service. In an embodiment, responsive to enrollment, a virtual service enrollment client may create a subspace within the owner's user space specifically for the service (e.g., the virtual service subspace, such as virtual service subspace 335 depicted in FIG. 3). In this example, an owner seeking to use the photo sharing application and associated virtual service may initiate a process by which a subspace, specifically for use by the virtual service, is created within the user space. For example, the owner may access a photo sharing interface providing a function (e.g., the virtual service enrollment client) to accept the service into their user space and initiate the creation of the virtual service and virtual service subspace.

An application may access the virtual service, for example, through a web browser application or an application installed on a computing device (e.g., a "mobile app" installed on a smart phone or other mobile information handling device). The virtual service plug-in to the user space does not require on-server development, one-server software installation, or virtual appliances.

The owner of the user space may have digital assets (e.g., digital photos) in the photo sharing subspace or in any other construct contained within the user space. Exposing the digital assets via the virtual service subspace does not involve the copying of the digital assets. For instance, an owner may create an "album" data storage structure of digital images in the photo sharing application subspace that may include digital images in the photo sharing application subspace of other owners. The digital images from other owners may be accessed by reference objects according to certain embodiments provided herein. For example, a user may only access digital assets of another user according to any permission or access control policies associated with their user space. In an embodiment, a user space or subspace access policy may include one or more predefined access rules (e.g., grant viewing rights to "friends" or "connections" associated with the owner). For example, one access rule may require access requests to originate with a specialized client or agent associated with the virtual service, for instance, to ensure that the subspace remains viable for the virtual service.

The virtual service subspace may comprise a resource indicator, for example, a well-known endpoint (URI) pattern that may be identified by an API exposure layer. In an embodiment, all access via the virtual service subspace may be tracked by the network provider (e.g., ISP, NSP) as being associated with the resource indicator and, therefore, associated with the owner of the user space where the virtual service subspace resides. In this manner, a network provider may separate out activity and accesses associated with the virtual service subspace and perform additional functions with this information, such as additional billing or other revenue related activity, for such access.

Figure 4:
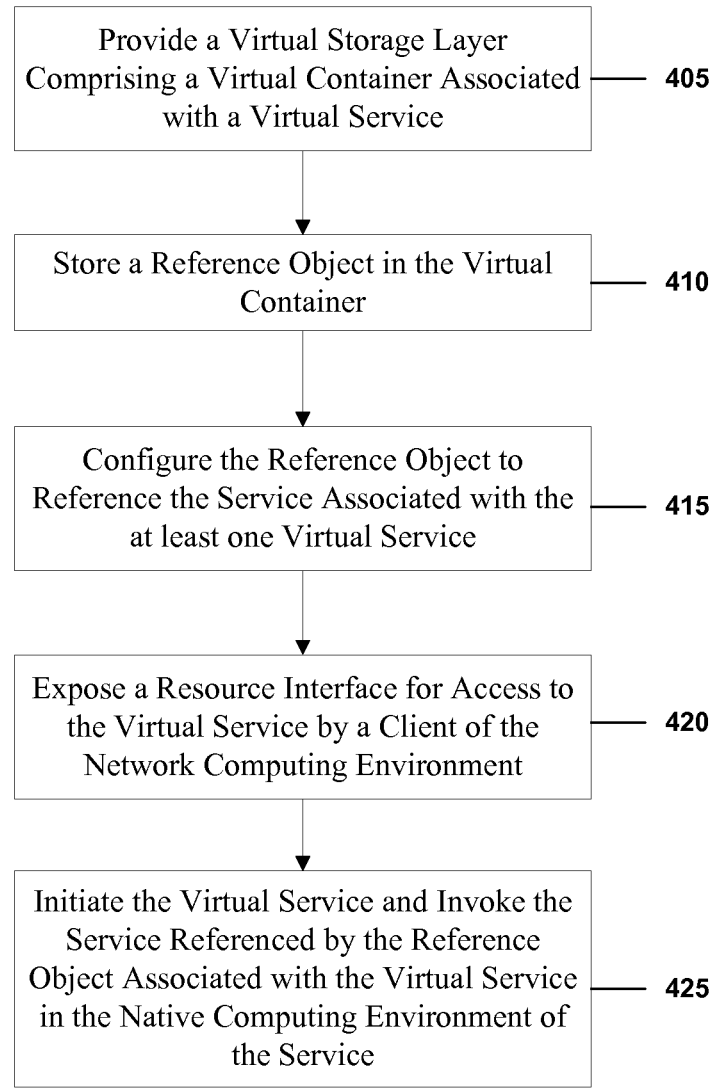
FIG. 4 depicts a flow diagram for an illustrative method of providing virtual access to a service according to an embodiment.

FIG. 4 depicts a flow diagram for an illustrative method for providing virtual access to a service according to an embodiment. The illustrative method of FIG. 4 may be performed, for example, by the computing device 500 depicted in FIG. 5, which is described in more detail below in reference to FIG. 5. In addition, the illustrative method of FIG. 4 may include one or more operations, functions, or actions as illustrated by one or more of blocks 405, 410, 415, 420, and/or 425. The operations described in blocks 405 through 425 may also be stored as computer-executable instructions in a computer-readable medium, such as the memory 525 of the computing device 500 depicted in FIG. 5. Although illustrated as discrete blocks, various blocks may be divided into additional blocks, combined into fewer blocks, or eliminated, depending on the desired implementation.

Beginning at block 405, the computing device may provide a virtual storage layer comprising a virtual container associated with a virtual service. For example, a virtual storage layer may be implemented by a software application, configured to store information, including, but not limited to, data and reference objects. The information may be stored in one or more data storage constructs, such as a virtual container. The virtual storage layer may be in communication with one or more of a physical storage layer and a logical storage layer configured to store actual data, applications, services, and the like. The virtual storage layer may be in the same or in a different network computing environment than the physical and/or logical storage layers. For example, the virtual storage layer may be implemented in a cloud computing environment, while the logical storage layer and the corresponding physical storage layer may reside in a separate ISP network. Block 405 may be followed by block 410.

At block 410, the computing device may create a reference object and store the reference object in the virtual container. For instance, an owner of the virtual container may create a reference object related to a virtual service associated with the virtual container. In an example, the virtual container may comprise a virtual service subspace contained within a user space associated with the owner. The reference object may operate to relate the virtual service associated with the virtual service subspace with an actual service residing within the same or an external network. In another example, the reference object may comprise a reference to an object, such as a digital asset used by a virtual service associated with the virtual container. In a further example, a service initiation agent may generate the reference object responsive to a request by an owner of the virtual container. Block 410 may be followed by block 415.

At block 415, the computing device may configure the reference object to reference the service associated with the at least one virtual service. For instance, the virtual server may be associated with an electronic image sharing (e.g., photo sharing) application. The reference object may be configured, inter alia, to point to the network location supporting the photo sharing application. For example, the reference object may provide a virtual pointer based on an IP address or other addressing method. In another example, the computing device may operate to discover the address or other location information of the service based on certain starting information, such as a service name or category (e.g., a photo sharing category or a service name, such as Instagram®). Block 415 may be followed by block 420.

At block 420, the computing device may expose a resource interface for access to the virtual service by a client of the network computing environment supporting the virtual service. For instance, the virtual container storing the virtual service may be associated with an identifier, such as a URI, that may be accessed by a resource interface. An illustrative resource interface is an API, which may be exposed to network clients, such as by API exposure applications including applications provided by Apigee® Corp. Exposure of the resource interface may allow clients to access virtual containers storing reference objects, for example, to facilitate sharing of data and resources. Block 420 may be followed by block 425

At block 425, the computing device may initiate the virtual service, invoking the service referenced by the reference object associated with the virtual service in the native computing environment of the service. For instance, a user may access and initiate the virtual service through a client computing device, including, without limitation, a personal computer (PC or workstation), a laptop, a smart phone, a personal digital assistant (PDA), a tablet computing device, a camera (e.g., an IP camera), and a sensor. In an example, the user may have created an application having an API interface that interacts with the virtual container storing the reference object for the virtual service. For example, the application may incorporate services provided by Twitter®, such as a content feed service. The user may initiate the application, directing the computing device supporting the virtual service to use the reference object to locate and invoke the service associated with the virtual service. The service operates in the native computing environment, for example, the computing environment where the service is installed. In another example, the service may operate in the virtual container where the associated virtual service is embedded. In this manner, the computing device may provide access to a service without having to install any software, data, or other supportive elements, as the service operates in its native computing environment.

According to certain embodiments, the virtual storage layer may provide a uniform platform for clients to access heterogeneous software and/or hardware common in conventional networks. A client device operating a service through the virtual storage layer does not have to be aware of the underlying hardware and/or software and whether the client device is compatible with same, for example, because the service operate in its native environment.

Figure 5:
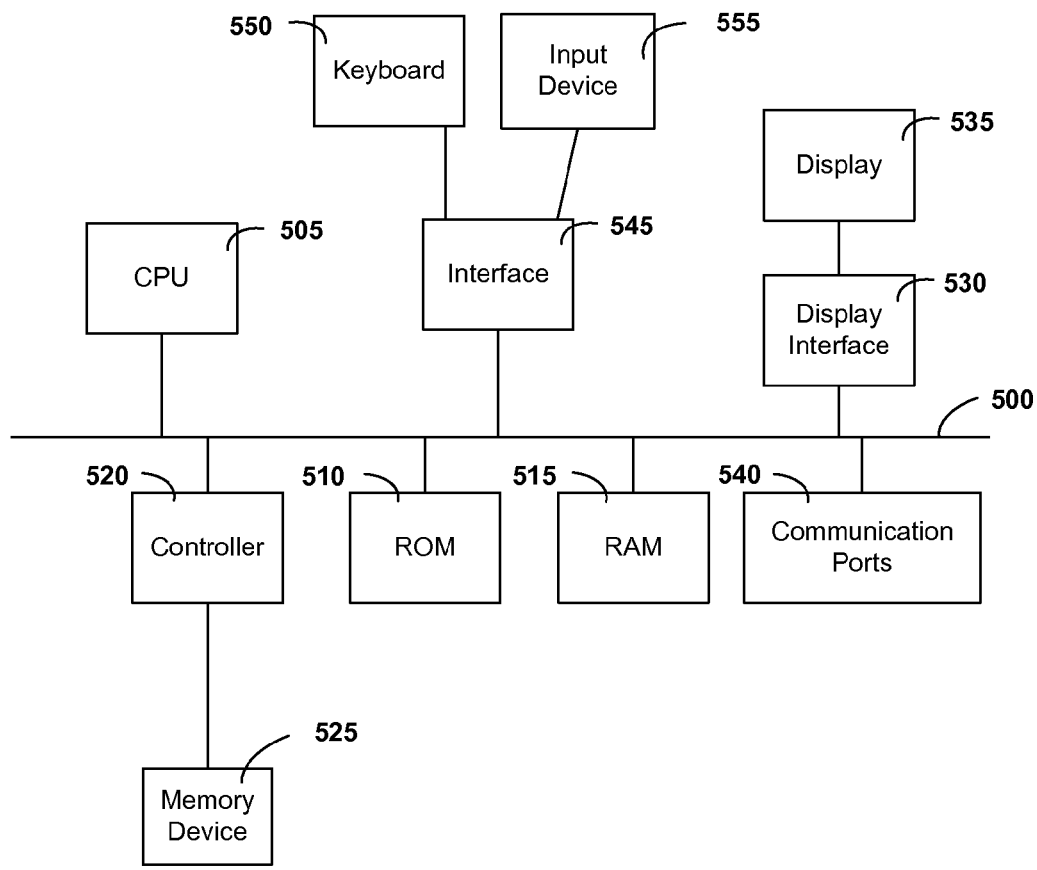
FIG. 5 depicts a block diagram of illustrative internal hardware that may be used to contain or implement program instructions according to an embodiment.

FIG. 5 depicts a block diagram of exemplary internal hardware that may be used to contain or implement program instructions, such as the process steps discussed above in reference to FIG. 4, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-Ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for providing virtual access to at least one service, the system comprising:
   a virtual storage layer arranged on at least one server computing device in a network computing environment, the virtual storage layer comprising at least one virtual container associated with at least one virtual service and identifiable via a universal resource identifier;
   at least one reference object stored in the at least one virtual container and configured to reference the at least one service associated with the at least one virtual service; and
   at least one resource interface configured to provide access to the at least one virtual service to at least one client of the network computing environment,
   wherein the system initiates the at least one virtual service responsive to receiving initiation input from the at least one client via the at least one reference object, the at least one virtual service being configured to invoke the at least one service to operate in a native computing environment of the at least one service, thereby providing the at least one client with access to the at least one service without requiring additional computational components for the at least one service being installed on the at least one server computing device.

2. The system of claim 1, wherein the at least one resource interface comprises an application programming interface.

3. The system of claim 1, wherein the at least one reference object further comprises at least one data object accessible by the at least one virtual service.

4. The system of claim 1, wherein the at least one virtual storage layer is in communication with at least one logical storage layer storing the at least one service.

5. The system of claim 1, wherein the network computing environment comprises a cloud computing environment.

6. The system of claim 1, wherein the at least one service comprises a content sharing service.

7. The system of claim 1, wherein the at least one virtual container comprises a user space associated with an owner.

8. The system of claim 1, wherein the virtual storage layer is located in a first network computing environment and the at least one service is located in a second network computing environment.

9. A method of providing virtual access to at least one service, the method comprising, by a processor of a computing device:
   providing a virtual storage layer on at least one server computing device arranged in a network computing environment, the virtual storage layer comprising at least one virtual container associated with at least one virtual service and identifiable via a universal resource identifier;
   storing at least one reference object in the at least one virtual container, the at least one reference object being configured to reference the at least one service associated with the at least one virtual service; and
   exposing at least one resource interface to provide access to the at least one virtual service to at least one client of the network computing environment,
   wherein the computing device initiates the at least one virtual service responsive to receiving initiation input from the at least one client via the at least one reference object, the at least one virtual service being configured to invoke the at least one service to operate in a native computing environment of the at least one service, thereby providing the at least one client with access to the at least one service without requiring additional computational components for the at least one service being installed on the at least one server computing device.

10. The method of claim 9, further comprising associating the at least one virtual container with an owner.

11. The method of claim 10, further comprising providing access to the at least one reference object based on one or more access control policies associated with the owner.

12. The method of claim 9, further comprising creating the at least one virtual container responsive to the computing device receiving an enrollment request to participate in the at least one service.

13. The method of claim 9, further comprising configuring the at least one virtual storage layer to be in communication with at least one logical storage layer storing the at least one service.

14. The method of claim 9, further comprising tracking accesses to the at least one virtual service via the resource indicator.

15. The method of claim 9, wherein the at least one resource interface comprises an application programming interface.

16. The method of claim 9, wherein the virtual storage layer is located in a first network computing environment and the at least one service is located in a second network computing environment.

17. A non-transitory computer readable storage medium having computer readable program code configured to provide virtual access to at least one service embodied therewith, the computer readable program code comprising:
   computer readable program code configured to provide a virtual storage layer on at least one server computing device arranged in a network computing environment, the virtual storage layer comprising at least one virtual container associated with at least one virtual service and identifiable via a universal resource identifier;
   computer readable program code configured to store at least one reference object in the at least one virtual container, the at least one reference object being configured to reference the at least one service associated with the at least one virtual service;
   computer readable program code configured to expose at least one resource interface to provide access to the at least one virtual service to at least one client of the network computing environment; and
   computer readable program code configured to initiate the at least one virtual service responsive to receiving initiation input from the at least one client via the at least one reference object, the at least one virtual service being configured to invoke the at least one service to operate in a native computing environment of the at least one service, thereby providing the at least one client with access to the at least one service without requiring additional computational components for the at least one service being installed on the at least one server computing device.

18. The non-transitory computer readable storage medium of claim 17, further comprising computer readable program code configured to associate the at least one virtual container with an owner.

19. The non-transitory computer readable storage medium of claim 18, further comprising computer readable program code configured to provide access to the at least one reference object based on one or more access control policies associated with the owner.

20. The non-transitory computer readable storage medium of claim 17, further comprising computer readable program code configured to create the at least one virtual container responsive to a computing device associated with the virtual storage layer receiving an enrollment request to participate in the at least one service.

\* \* \* \* \*